United States Patent Office 3,311,573
Patented Mar. 28, 1967

3,311,573
FOAMING COMPOSITIONS
Neil Bonnette Graham and James David Murdock, St. Hilaire, Quebec, Canada, assignors to Canadian Industries Limited, Montreal, Quebec, Canada, a corporation of Canada
No Drawing. Filed Apr. 23, 1963, Ser. No. 274,908
Claims priority, application Great Britain, Nov. 27, 1962, 44,863/62, 44,865/62, 44,867/62; Feb. 5, 1963, 4,724/63, 4,726/63, 4,728/63
15 Claims. (Cl. 260—2.5)

This invention relates to novel compositions suitable for the production of foamed cellular polymeric materials novel foaming processes employing such compositions and the novel foamed cellular polymeric materials obtained therefrom.

It is known to manufacture solid foamed polymeric materials by expanding polymeric materials with numerous gas bubbles to yield products having densities as low as one or two pounds per cubic foot. Such polymeric foams are known in both rigid and flexible forms, and typical examples thereof are the polyurethane and polystyrene foams. The former are capable of being foamed-in-place to fill cavities of irregular shape, and they may also be dispensed from mixing machines to coat articles with thick insulating blankets. Their isocyanate ingredients are, however, undesirably toxic under some conditions. The polystyrene foams, on the other hand, are not conveniently foamed-in-place since requiring external heating for this purpose and, in addition, they do not flow easily into complex cavities and do not bond to surfaces.

It is an object of this invention to provide new foaming compositions which are suitable for the production of foamed-in-place polymeric materials and the ingredients of which do not present the toxicity problems encountered with the ingredients of polyurethane foaming compositions. Another object of the invention is to provide new compositions which yield polymeric foams having a wide variety of properties suitable for many end uses. Additional objects of the invention will appear hereinafter.

The new foaming compositions of this invention comprise at least one polymerizable vinyl ether containing at least two vinyl groups per molecule, at least one vinyl ether-reactive member selected from the group consisting of phenolic compounds and epoxidized materials containing at least one epoxide group per molecule, a foaming agent and an acidic catalyst.

Any foaming agent may be used in the compositions, particularly those which have been proposed for use in conjunction with polyurethane materials for the production of foamed or cellular materials. Volatile foaming agents are particularly suitable.

As suitable acidic catalysts, there may be used, in particular, those acidic catalysts which have been proposed for the polymerization of vinyl ethers and, more particularly, those which have been proposed for the polymerization of vinyl ethers having two vinyl groups. Especially useful catalysts are the strong acidic ones.

Preferred foaming compositions according to this invention comprise, in addition to the foaming agent and acidic catalyst, at least one polymerizable vinyl ether containing at least two vinyl groups per molecule in admixture with the following vinyl ether-reactive materials in the proportions indicated:

(a) A compatible phenolic compound and, optionally, minor proportions of a compatible aliphatic monohydric or polyhydric alcohol and/or epoxidized material containing at least one epoxide group per molecule, the proportions of the ingredients being preferably such that the number of hydroxyl groups provided by said phenolic compound and alcohol, if the latter is present, is less than the number of vinyl groups provided by said vinyl ether together with the number of epoxide groups provided by said epoxidized material if the latter is present;

(b) A compatible phenolic compound and a compatible epoxidized material containing at least one epoxide group per molecule, the proportions of the ingredients being preferably such that the number of hydroxyl groups provided by said phenolic compound is not greater than about 75% of the combined number of vinyl and epoxide groups provided by said vinyl ether and epoxidized material, respectively; or (c) A compatible epoxidized material containing at least one epoxide group per molecule.

Under the influence of the catalyst and in the presence of the foaming agent, the polymerizable vinyl ether and the vinyl ether-reactive compound or compounds undergo chemical reaction leading to the formation of polymeric foamed materials of widely varied properties and utilities. It has been found that organic bases such as the dimethyl tertiary amines derived from cononut fatty acids can be used to retard the reaction of the foam-forming ingredients of the compositions.

The foaming compositions of this invention may also include materials copolymerizable with the other ingredients thereof, e.g. cyclic anhydrides, as well as non-reactive additives which may be flame retardants, surfactants, dyes, fillers, stabilizers, antioxidants, extenders, plasticizers and viscosity-modifiers such as polyvinyl chloride, vinyl acetate/vinyl chloride copolymers and rubbers.

The polymerizable vinyl ethers, suitable for use in the foaming compositions of this invention, are ethers in which at least two vinyl groups are each joined to an ether oxygen atom.

They may have a generic formula such as (1) $$R_3C=CR_1-O-R_1C=CR_3$$
        $R_2$              $R$ (2) $$\left[ R_3C=CR_1-O-\underset{R_6}{\overset{R_4}{\underset{|}{\overset{|}{C}}}}-\underset{}{\overset{R_5}{\underset{}{}}} \right]_2$$

or (3) $$\left[ R_3C=CR_1-O-\underset{R_6}{\overset{R_4}{\underset{|}{\overset{|}{C}}}}-\underset{}{\overset{R_5}{\underset{}{}}} \right]_n - A$$

wherein $n$ is an integer having a value of at least 2, $R_1$ and $R_2$ are members selected from the group consisting of hydrogen and alkyl radicals, $R_3$ is a member selected from the group consisting of hydrogen, halogen atoms and hydrocarbyl radicals, $R_4$ and $R_5$ taken together form a member selected from the group consisting of two hydrogen atoms, two alkyl radicals and one alkylene or substituted alkylene radical, $R_6$ is a member selected from the group consisting of hydrogen and alkyl radicals, and $A$ is a linking group having a valence equal to $n$.

Examples of the aforementioned vinyl ethers are: divinyl ether, di-isopropenyl ether, butanediol divinyl ether, propylene oxide/polyol condensates of the formulae $$CH_2=CH-O-(CH_2-\underset{CH_3}{\overset{|}{C}}H-O)_n-CH=CH_2$$

and $$C \overset{\diagup}{\underset{\diagdown}{\phantom{x}}} \left[ CH_2-O-(CH_2-\underset{CH_3}{\overset{|}{C}}H-O)_n-CH=CH_2 \right]_4$$

wherein n is any integer, 3,4-dihydro-2H-pyran-2-methyl-(3,4-dihydro-2H-pyran-2-carboxylate) of the formula

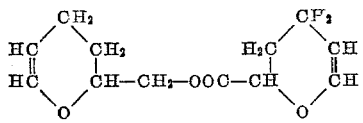

1,2 - ethanedioxy - bis - (3',4' - dihydro - 2'H - pyran-2'-carbonyl) of the formula

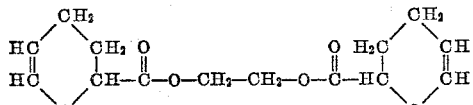

bis-(3,4-dihydro-2H-pyran-2-methyl) succinate of the formula

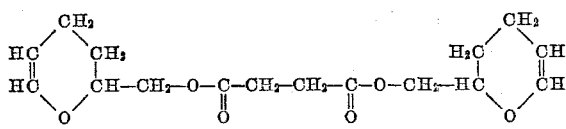

1,2-bis(3',4'-dihydro-2'H-pyran-2'-oxy)ethane of the formula

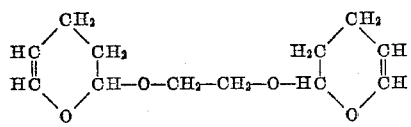

1,2-bis(3',4'-dihydro-2'H-pyran-2'-oxy)ethane of the for-formula

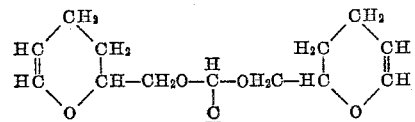

1,2-ethanedioxy-bis(3',4'-dihydro-5'-methyl - 2'H - pyran-2'-carbonyl) of the formula

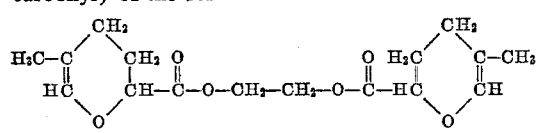

1,2-bis(3',4'-dihydro-5'-methyl - 2'H-pyran-2'-oxy)ethane of the formula

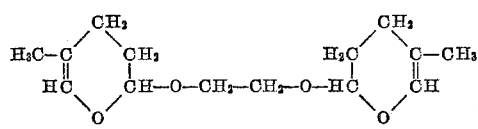

1,1-bis(3',4'-dihydro - 5' - methyl-2'H-pyran-2'-methoxy) ethane of the formula

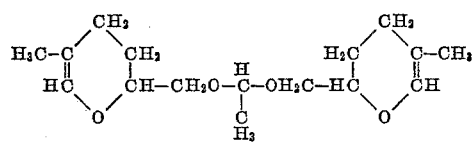

toluene - 2,4 - bis - (3',4' - dihydro-2'H-pyran-2'-methyl) carbamate of the formula

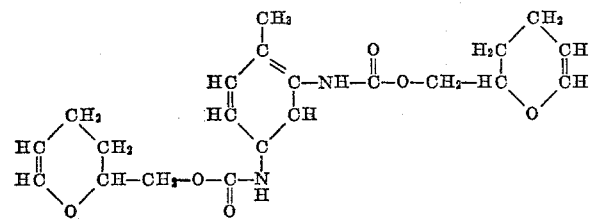

the tri-ester derived from three moles of 2-hydroxymethyl-3,4-dihydro-2H-pyran and one mole of orthophosphoric acid, and the esters derived from 2-hydroxymethyl-3,4-dihydro-2H-pyran and organic polybasic acids as maleic and adipic acids. It has been found that the straight chain vinyl ethers are more reactive than branched chain or cyclic vinyl ethers. It is desirable that the vinyl ethers do not boil during the foam-forming reaction.

The phenolic compounds used as ingredients in the foaming compositions are those aromatic compounds which contain one or more hydroxyl groups in their molecules such as phenol, alkyl-substituted phenols, e.g., cresols, halogen-substituted phenols, e.g., 2,4,5-trichlorophenol, resorcinol, phloroglucinol, catechol, hydroquinone, 2:2-di-p-hydroxy-phenylpropane, low molecular weight phenol-terminated polycarbonates, the condensation products of phenols with aldehydes and ketones, etc.

The aliphatic monohydric and polyhydric alcohol ingredients of the foaming compositions of this invention include amyl alcohol, 2-ethylhexyl alcohol, nonyl alcohol, n-decyl alcohol, polypropylene glycol, caster oil, sugar alcohols, alkyl and acyl cellulose derivatives, polyether condensates of polyhydric alcohols and olefin oxides such as the polypropylene oxide condensates of hexahydroxy sugar alcohols and propylene oxide, ethylene glycol, 1,5-pentanediol, glycerol, 1,2,6-hexanetriol and hydroxyl-containing esters and polyesters obtained by condensation of polyhydric alcohols and polybasic acids. The proportions of condensating ingredients in said hydroxyl-containing esters and polyesters may range from one mole of polyol for each carboxylic acid group in the acid to one mole of polycarboxylic acid for each hydroxyl in the polyol. The first limit gives an ester containing free alcoholic hydroxyl groups whereas the second gives an ester containing carboxylic acid groups; in between these limits, polyesters are formed which contain both hydroxyl and carboxylic acid groups.

By "epoxidized materials containing at least one epoxide group per molecule" are meant compounds containing at least one group of the formula

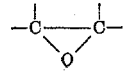

per molecule. Examples of such compounds are epichlorohydrin, styrene oxide, diallyl ether monoxide, cyclohexene oxide, glycidyl phenyl ether, glycidyl stearate, dipentene dioxide, vinyl cyclohexene dioxide, polyallyl glycidyl ether, diphenylolpropane diglycidyl ether, epoxidized polybutadiene, epoxidized styrene-butadiene copolymers, the resinous condensates of epichlorohydrin and aliphatic or aromatic polyols such as glycerol or 2:2-di-p-hydroxyphenyl propane, etc.

Volatile foaming agents suitable for use in the foaming compositions of the invention are those which are soluble or dispersible in the other ingredients of the foaming compositions and are sufficiently volatile that they vaporize during the formation of the foamed polymeric materials. The heat of the catalyzed polymerization reaction causes the foaming agent to boil, and the vapour forms bubbles which expand during the polymerization reaction to give a low density, foamed polymerized mass. Preferred foaming agents are the halogenated hydrocarbons such as trichloromonofluoromethane, dichlorotetrafluoroethane, trichlorotrifluoroethane, dibromodifluoromethane, dichlorohexafluorocyclobutane, methylene chloride, chloroform, trichloroethylene, carbon tetrachloride and perchloroethylene.

The strong acid catalysts suitable for promoting the reaction of the polymer-forming ingredients of the foaming compositions include the strong proton-donating acids, such as p-toluenesulphonic acid, and the Lewis acids such as trimethoxyboroxine and boron trifluoride conveniently employed as the etherate, $BF_3 \cdot (C_2H_5)_2O$. Compositions containing very reactive vinyl ethers such as butanediol divinyl ether can be catalyzed by p-toluenesulphonic acid but a Lewis acid catalyst is preferred for those compositions containing 3,4-dihydro-2H-pyranyl compounds including the 3,4-dihydro-2H-pyran-2-methyl (3,4-dihydro-2H-pyran-2-carboxylate) referred to hereinafter.

It is possible to control the polymerization reaction by employing catalyst combinations e.g. p-toluene sulphonic acid and boron trifluoride or boron trifluoride and trimethoxyboroxine. Other materials which are suitable as catalytic ingredients are ferric chloride, stannic chloride, phosphorus pentachloride, phosphoric acid, perchloric acid, acetic acid, trifluoroacetic acid, trichloroacetic acid, fluoboric acid, boron trifluoride dihydrate, hydrogen fluoride, antimony penta-fluoride, hexafluorophosphoric acid, lead fluoborate, antimony fluoborate, sulphuric acid and silicotungstic acid. The solvent in which the catalyst is dissolved also affects the catalyst reactivity, polypropylene glycol solutions of $BF_3.(C_2H_5)_2O$ being less reactive than xylene solutions of said catalyst. Suitable catalytic amounts range from 0.005% to 2.0% by weight of the compositions, but these amounts are not limitative since the amount of catalyst should be adjusted to the temperature of operation and the foam induction period required. When Lewis acids are used as catalysts in foaming compositions devoid of phenolic or alcoholic ingredients, it is often advantageous to incorporate into the compositions small amounts of co-catalysts such as water, alcohols or carboxylic acids.

Suitable flame-retardants for incorporation in the foaming compositions include trichloroethylphosphate, 2:2-bis-(3',5'-dibromo-4'-hydroxyphenyl) propane, chlorendic acid, and polyvinyl chloride, with or without antimony oxide. The phenolic compound serves both as flame-retardant and vinyl ether-reactive material.

The preferred surfactants are those of the silicone type, examples of which are disclosed in Belgian Patent Nos. 582,362 and 584,089, i.e. being of the siloxane oxyalkylene copolymer type.

In the above list of vinyl ether-reactive materials, preferred proportions are indicated. However, the proportions of such reactive materials in relation to proportions of vinyl ethers may vary considerably. The use of widely differing proportions leads to the formation of foamed materials of differing properties, e.g. different compression strength, density and texture. In order to obtain foamed materials of advantageous properties and of particular utility, it is often necessary to vary the proportions of vinyl ether and vinyl ether-reactive material according to the nature of the reactive material used.

Referring, then, to particularly preferred proportions of the ingredients of the foaming compositions of this invention, it has been found that in the case of compositions containing ether-reactive material (a), preferred compositions comprise at least 50% by weight of vinyl ether, said vinyl ether always being present in the aforementioned proportion in relation to the other ingredients, the phenolic ingredient in proportion restricted in the manner hereinbefore specified, and from 2% to 30% by weight of the foaming agent, the remaining constituents such as surfactant, aliphatic monohydric or polyhydric alcohol and epoxidized material each being present in an amount less than about 5% by weight.

The polymerization of vinyl ethers containing at least two vinyl groups per molecule under the influence of strong acid catalysts is very rapid with the result that dark coloured foams of poor structure can often be obtained. However, the admixture of phenolic compounds with the vinyl ethers shortens the induction period of the foams and slows up their rate of set so that splits are less frequent and lighter-coloured foams of improved structure are obtained.

Preferred compositions containing ether-reactive material (b) are those in which the combined weight of the vinyl ether and the epoxidized material is at least 50% of the weight of the compositions, the amount of phenolic compound being such that the number of hydroxyl groups provided thereby is not greater than about 75% of the combined number of vinyl and epoxide groups provided by the vinyl ether and epoxidized material, respectively, the amount of foaming agent being from 2% to 30% by weight and the remaining constituents such as flame-retardant and surfactant each being present in an amount less than about 5% by weight.

The incorporation of epoxidized material into foaming compositions containing the vinyl ethers and the phenolic compounds results in foams with improved characteristics when compared to foams obtained from said compositions devoid of epoxidized material. The inclusion of the epoxide-containing material indeed results in lighter-coloured foams with excellent tough skins whereas foams obtained from compositions containing no epoxide ingredient often have friable brittle skins. The epoxide-containing compositions also give more resilient foams.

Desirable compositions containing ether-reactive material (c) comprise 5% to 75% by weight of the vinyl ether, 80% to 10% by weight of epoxidized material containing two or more epoxide groups per molecule or a mixture of such a polyepoxide with a monoepoxide, in which case the number of epoxide groups provided by said monoepoxide is less than three times the combined number of vinyl groups and epoxide groups provided by said vinyl ether and polyepoxide, respectively, and from 2% to 30% by weight of foaming agent, the remaining ingredients such as surfactant and flame-retardant being present in amounts less than about 15% by weight.

The admixture of epoxidized material with the vinyl ethers results in foams which are whiter and usually have better skins than foams based on vinyl ethers alone. However, when the amount of epoxide ingredient exceeds about 25% by weight of the compositions, the resulting foams tend to split. When splitting occurs with compositions containing a boron trifluoride catalyst, the splitting of the foams may be eliminated by using as catalyst a combination of boron trifluoride and trimethoxy boroxine.

The ingredients of the foaming compositions may simply be mixed by stirring in a vessel and then quickly poured into a mould. They may also be mixed in the space which is to be filled with foam if it is suitably shaped. When such stirred mixing is used, it is highly desirable that a surfactant be added to the compositions in order to give foams of small bubbles. However, a surfactant is not always essential.

EXAMPLE 1

As previously mentioned, the polymerization of vinyl ethers containing at least two vinyl groups per molecule under the influence of Lewis acid catalysts is very rapid so that dark-coloured foams of poor structure are often obtained. However, the addition of phenolic compounds shortens the induction period, slows up the rate of set so that splits are self-healing, and yields lighter-coloured foams of improved structure. This is illustrated in Table V where the foaming of compositions containing increasing amounts of 2:2-di-p-hydroxyphenyl propane is described.

The foams were produced by dissolving powdered 2:2-di-p-hydroxyphenylpropane in 3,4-dihydro-2H-pyran-2-methyl-(3,4-dihydro-2H-pyran-2-carboxylate) while heating at 130° C. for 30 minutes, cooling, and adding a silicone surfactant of siloxane oxyalkylene copolymer type and a portion of the foaming agent (trichloromonofluoromethane) to form a first mixture. A second mixture containing the boron trifluoride etherate dissolved in polypropylene glycol of molecular weight 2025 and the remainder of the foaming agent was then prepared. The two mixtures were blended using a high speed stirrer and poured into moulds.

TABLE I

| Distilled 3,4-dihydro-2H-pyran-2-methyl-(3,4-dihydro-2H-pyran-2-carboxylate), g. | 2:2-di-p-hydroxyphenyl-propane, g. | Trichloromonofluoro-methane, g. | Siloxane oxyalkylene copolymer type silicone surfactant, g. | Boron trifluoride 10% solution in polypropylene glycol solution, g. | Polypropylene glycol, g. | Induction period | Density, lbs./ft.$^3$ | Force required for 10% compression, lbs./inch$^2$ | |
|---|---|---|---|---|---|---|---|---|---|
| | | | | | | | | I Perpendicular to direction of rise | II Parallel to direction of rise |
| 190 | --------- | 50 | 0.5 | 0.5 | 10 | -------- | -------- | Composition charred and did not rise | |
| 190 | 10 | 50 | 2.0 | 2.5 | 10 | 6 min... | -------- | Composition charred and did not rise | |
| 190 | 20 | 50 | 2.0 | 2.5 | 10 | 55 sec... | -------- | Composition rose 4 in. charred | |
| 190 | 30 | 50 | 2.0 | 2.5 | 10 | 110 sec... | -------- | Composition foamed with darkening and splitting | |
| 190 | 40 | 50 | 2.0 | 2.5 | 10 | 2¾ min. | 1.86 | 8.3 | 15 |
| 190 | 60 | 50 | 2.0 | 2.5 | 10 | 39 sec... | 2.2 | 13.9 | 30.3 |

The bottom composition produced a foam of good characteristics.

EXAMPLE 2

200 g. of crude 3,4-dihydro-2H-pyran-2-methyl-(3,4-dihydro-2H-pyran-2-carboxylate) were heated at 130° C. while 50 g. of powdered 2:2-di-p-hydroxyphenylpropane were added and dissolved. The mixture was cooled to room temperature and 2 g. of siloxane oxyalkylene copolymer type silicon surfactant and 30 g. of trichloromonofluoromethane foaming agent were added.

A second mixture of 3.5 g. of a 10% solution of boron trifluoride in polypropylene glycol of 2025 molecular weight and 30 g. of trichloromonofluoromethane was prepared. The two mixtures were blended for 5 seconds using a high speed stirrer and then poured into a 7" x 7" x 12" mould. After a total induction period of 16 seconds, the foam rose to a height of 15 inches. The overall foam density was 1.7 lb./ft.$^3$ and the core density was 1.5 lbs./ft.$^3$. The foam was anisotropic, requiring 16 lbs./inch$^2$ to produce a 10% compression parallel to the direction of the rise and 6 lbs./inch$^2$ to produce a 10% compression perpendicular to this direction.

Another foam prepared from a similar recipe had a constant of thermal conductivity K of 0.13 B.t.u. per sq. ft. per hour per degree F. per inch.

EXAMPLE 3

Preparation of Novolak resin

A mixture of phenol (3120 g.), distilled water (312 ccs.), 37% aqueous formaldehyde (2220 g.) and oxalic acid dihydrate (24 g.) was placed in a 12 litre four-necked flask equipped with condenser, stirrer and liquid and vapour thermometer. The mixing reaction was endothermic and the mixture cooled to 5° C. The mixture was heated under reflux for 30 minutes and then a further 24 g. of oxalic acid dihydrate were added. The mixture was heated under reflux for an additional hour. At this stage, a heavy white material separated. Then 6 litres of cold water were added, the stirrer was removed and the mass was allowed to cool to room temperature. As much as possible of the water was siphoned off, the remainder (1 litre) being distilled off under vacuum until the temperature reached 120° C. The Novolak remaining in the flask weighed 3100 g.

Preparation of foam

Two mixtures were made up as in Example 2.

MIXTURE A

G.

Crude 3,4-dihydro-2H-pyran-2-methyl-(3,4-dihydro-2H-pyran-2-carboxylate) _____ 200
Novolak resin _____ 50
Siloxane oxyalkylene copolymer type silicone surfactant _____ 2
Trichloromonofluoromethane _____ 25

MIXTURE B

G.

10% boron trifluoride in polypropylene glycol (M.W. 2025) _____ 3.5
Trichloromonofluoromethane _____ 25

Mixture B was poured into Mixture A and blended for 10 seconds before pouring into a 7" x 7" x 12" mould. After an induction period of 31 seconds, the foam rose 12 inches. The overall density was 2 lbs./ft.$^3$ and the core density was 1.8 lbs./ft.$^3$. The force needed to give 10% compression was 16 lbs./inch$^2$ parallel to the direction of rise and 6.5 lbs./inch$^2$ perpendicular to it.

EXAMPLE 4

The following two mixtures were prepared and blended as in Example 3 to produce a foam.

MIXTURE A

G.

Crude 3,4-dihydro-2H-pyran-2-methyl-(3,4-dihydro-2H-pyran-2-carboxylate) _____ 200
2:2-di-p-hydroxyphenylpropane _____ 30
2:2-bis(3',5'-dibromo-4'-hydroxyphenol)propane __ 50
Siloxane oxyalkylene copolymer type silicone surfactant _____ 2
Trichloromonofluoromethane _____ 30

MIXTURE B

G.

10% boron trifluoride in polypropylene glycol (M.W. 2025) _____ 3.5
Trichloromonofluoromethane _____ 30

A block of foam of core density 1.8 lbs./ft.$^3$ was obtained after an induction period of 13 seconds. The force needed for 10% compression was 16 lbs./inch$^2$ parallel to the direction of rise and 5.8 lbs./inch$^2$ perpendicular to it. The foam was "self-extinguishing" by ASTM-1692-59-T due to the presence therein of 2:2-bis(3',5'-dibromo-4'-hydroxyphenyl)propane.

EXAMPLE 5

The following two mixtures were prepared and blended as in Example 3 to produce a foam.

MIXTURE A

G.

Crude 3,4-dihydro-2H-pyran-2-methyl-(3,4-dihydro-2H-pyran-2-carboxylate) _____ 200
Novolak resin _____ 30
2:2-bis(3',5'-dibromo-4'-hydroxyphenyl)propane __ 50
Siloxane oxyalkylene copolymer type silicone surfactant _____ 2
Trichloromonofluoromethane _____ 25

MIXTURE B

| | G. |
|---|---|
| 10% boron trifluoride in polypropylene glycol (M.W. 2025) | 3.5 |
| Trichloromonofluoromethane | 25 |

After a 12 second induction period, the foam rose 11½ inches in the mould. The core density was 1.9 lbs./ft.$^3$ and the force needed for 10% compression was 22.6 lbs./inch$^2$ parallel to the direction of rise and 9.2 lbs./inch$^2$ perpendicular to it. The foam was "self-extinguishing" by ASTM–1692–59–T.

EXAMPLE 6

When foaming compositions are employed in conventional foam-dispensing equipment, it is desirable to have as much of the polymerizable mixture as possible dissolved in the foaming agent to give two streams which do not differ too greatly in viscosity. In this example, p-octyl phenol was used since it is soluble in trichloromonofluoromethane.

Two mixtures were prepared and blended for 15 seconds, before pouring into a 7″ x 7″ x 12″ mould. After 63 seconds, foaming occurred to give a foam with the following properties: Density overall 2.3 lbs./ft.$^3$; core density 2.0 lbs./ft.$^3$; force for 10% compression 17.3 lbs./inch$^2$ parallel to the direction of rise and 6 lbs./inch$^2$ perpendicular to it. The two mixtures had the following composition:

MIXTURE A

| | G. |
|---|---|
| Crude 3,4-dihydro-2H-pyran-2-methyl-(3,4-dihydro-2H-pyran-2-carboxylate) | 200 |
| 2:2-di-p-hydroxyphenylpropane | 50 |

MIXTURE B

| | |
|---|---|
| Trichloromonofluoromethane | 50 |
| p-Octyl phenol | 25 |
| Siloxane oxyalkylene copolymer type silicone surfactant | 2.5 |
| 10% boron trifluoride in polypropylene glycol (M.W. 2025) | 5.0 |

EXAMPLE 7

Two mixtures were prepared and blended as in Example 3.

MIXTURE A

| | G. |
|---|---|
| Crude 3,4-dihydro-2H-pyran-2-methyl-(3,4-dihydro-2H-pyran-2-carboxylate) | 200 |
| 2:2-di-p-hydroxyphenyl propane | 40 |
| 2,4,5-trichlorophenol | 60 |
| Siloxane oxyalkylene copolymer type silicone surfactant | 0.5 |

MIXTURE B

| | |
|---|---|
| Trichloromonofluoromethane | 50 |
| 10% boron trifluoride in polypropylene glycol (M.W. 2025) | 4 |

Foaming occurred after 80 seconds to give a light coloured foam which, though not "self-extinguishing," was very slow-burning because of the effect of the 2,4,5-trichlorophenol. It had a density of 3 lbs./ft.$^3$. The force required for 10% compression was 14.4 lbs./inch$^2$ parallel to direction of rise and 5.9 lbs./inch$^2$ perpendicular to it.

EXAMPLE 8

Two mixtures were prepared and blended as in Example 3.

MIXTURE A

| | G. |
|---|---|
| Crude 3,4-dihydro-2H-pyran-2-methyl-(3,4-dihydro-2H-pyran-2-carboxylate) | 190 |
| 2:2-di-p-hydroxyphenylpropane | 60 |
| Low molecular weight resinous condensate of 2:2-di-p-hydroxyphenyl propane and epichlorohydrin | 10 |

MIXTURE B

| | G. |
|---|---|
| 10% boron trifluoride in polypropylene glycol (M.W. 2025) | 2.5 |
| Trichloromonofluoromethane | 50 |
| Siloxane oxyalkylene copolymer type silicone surfactant | 2 |

The resulting foam had a density of 2.2 lbs./ft.$^3$. The force needed to produce 10% compression was 30.3 lbs./inch$^2$ parallel to the direction of the rise and 13.9 lbs./inch$^2$ perpendicular to it.

EXAMPLES 9 TO 23

Fifteen foaming compositions were prepared, each including the following mixture:

| | G. |
|---|---|
| Crude 3,4-dihydro-2H-pyran-2-methyl-(3,4-dihydro-2H-pyran-2-carboxylate) | 20 |
| 2:2-di-p-hydroxyphenylpropane | 5 |
| Trichloromonofluoromethane | 5 |
| Siloxane oxyalkylene copolymer type silicone surfactant | 0.5 | and each in addition containing a different catalyst. The fifteen catalyst compositions were as follows:

TABLE II

| | Catalyst Ingredients | Proportion of Ingredient respectively, grams |
|---|---|---|
| A | Phosphorus pentachloride, boron trifluoride etherate, diethylene glycol. | 1/1/9. |
| B | Orthophosphoric acid, boron trifluoride etherate, diethylene glycol. | 0.5/2/10. |
| C | Acetic acid, boron trifluoride etherate, diethylene glycol. | 0.5/1/5. |
| D | Trichloroacetic acid, boron trifluoride etherate, diethylene glycol. | 1.5/1.5/5. |
| E | Trifluoroacetic acid, boron trifluoride etherate, diethylene glycol. | 1/1.5/5. |
| F | Sulphuric acid, boron trifluoride etherate, diethylene glycol. | 0.25/0.75/10. |
| G | Silicotungstic acid, boron trifluoride etherate, diethylene glycol. | 0.5/1/5. |
| H | Stannic chloride, boron trifluoride dihydrate, diethylene glycol. | 1/0.5/10. |
| I | Stannic chloride, perchloric acid, diethylene glycol. | 1/0.5/20. |
| J | Perchloric acid, boron trifluoride etherate, diethylene glycol. | 0.5/0.3/8. |
| K | Fluoboric acid, diethylene glycol. | 2/8. |
| L | Stannic chloride, diethylene glycol. | 1/9. |
| M | Stannic chloride. | |
| N | Hydrogen fluoride, diethylene glycol. | 5/5. |
| O | Boron trifluoride/phenol complex, diethylene glycol. | 5/5. |

Measured amounts of the catalyst were added with stirring to the first mixture contained in a 250 cc. paper cup. The amount of catalyst and the character of the fifteen foams produced are shown in Table III.

TABLE III

| Example | Catalyst | Amount of Catalyst in drops | Induction Period, seconds | Height of Foam, inches |
|---|---|---|---|---|
| 9 | A | 30 | 180 | 2½ |
| 10 | B | 15 | 30 | 7½ |
| 11 | C | 35 | 180 | 5 |
| 12 | D | 30 | 45 | 3 |
| 13 | E | 20 | 100 | 6 |
| 14 | F | 25 | 30 | 6 |
| 15 | G | 25 | 25 | 7 |
| 16 | H | 20 | 230 | 7 |
| 17 | I | 20 | 60 | 7¾ |
| 18 | J | 8 | 35 | 5 |
| 19 | K | 20 | 110 | 7¾ |
| 20 | L | 20 | 600 | 7¼ |
| 21 | M | 10 | 780 | 6 |
| 22 | N | 30 | 450 | 6 |
| 23 | O | 31 | 300 | 6½ |

EXAMPLE 24

100 g. of crude 3,4-dihydro-2H-pyran-2-methyl-(3,4-dihydro-2H-pyran-2-carboxylate) were mixed with 25 g. of para-nitrophenol and heated at 65° C. to effect solution. 20 g. of trichloromonofluoromethane and 1.25 g. of a siloxane oxyalkylene copolymer silicone surfactant were added and the mixture stirred to give a solution. 1.75 ml. of a solution of fluoroboric acid (made by diluting a 40% aqueous solution to 10% by adding polypropyleneglycol) was added and after stirring for 50 seconds there was obtained a foaming mixture which rose and set solid in a further five seconds to give a yellow slightly coarse foam which was badly discoloured at its centre.

EXAMPLES 25 to 38

A series of fourteen foams were prepared containing 2:2-di-p-hydroxyphenyl propane and different vinyl ethers using the following procedure. The vinyl ether, 2:2-di-p-hydroxyphenyl propane, the siloxane oxyalkylene copolymer type silicone surfactant, and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table IV.

| Butanediol-1,4-bis-(3,4-dihydro-2H-pyran-2-yl) ether | g | 16 |
|---|---|---|
| 2:2-di-p-hydroxyphenyl propane | g | 8 |
| Trichloromonofluoromethane | g | 5 |
| Siloxane oxyalkylene copolymer type silicone surfactant | g | 0.1 |
| Boron trifluoride, 10% in diethylene glycol | ml | 0.1 |

The first four ingredients were mixed for 10 seconds and the boron trifluoride catalyst was then added with additional stirring. After an induction period of 30 seconds a rigid brittle foam was produced.

EXAMPLE 40

The trivinyl ether of a propoxylated phenol-aldehyde condensate was prepared as follows. The propoxylated phenol-aldehyde condensate ("Niax Triol" LK–380) of 440 average molecular weight was treated with acetylene at 180°–190° C. and at a pressure of 200–250 p.s.i. in the presence of 5% by weight of potassium hydroxide. The reaction was considered complete when the infra-red spectrum of the product indicated the absence of hydroxyl groups. The catalyst residue was removed by filtration. The following foaming composition was prepared.

TABLE IV

| Example | Vinyl Ether | 2:2-di-p-hydroxyphenyl propane, g. | Siloxane oxyalkylene copolymer type silicone surfactant, g. | Trichloromonofluoromethane, g. | Boron trifluoride 10% in diethylene glycol, ml. | Induction period, sec. | Rise time, sec. | Height of foam, in. |
|---|---|---|---|---|---|---|---|---|
| 25 | 3,4-dihydro-2H-pyran-(3,4-dihydro-2H-pyran-2-carboxylate): 20 g. | 5 | 0.5 | 5 | 0.5 | 15 | 10 | 9 |
| 26 | Bis-(3,4-dihydro-2H-pyran-2-methyl) succinate: 20 g. | 3 | 0.5 | 3 | (1) | 60 | 120 | -------- |
| 27 | Bis-(3,4-dihydro-2H-pyran-2-methyl) adipate: 20 g. | 5 | 0.5 | 5 | 0.5 | 55 | 65 | -------- |
|    | Bis-(3,4-dihydro-2H-pyran-2-methyl) azelate: |  |  |  |  |  |  |  |
| 28 | 20 g. | 5 | 0.5 | 5 | 0.5 | 110 | 35 | 5.5 |
| 29 | 20 g. | 5 | 0.5 | 5 | 0.8 | 95 | 35 | 4.75 |
| 30 | 20 g. | 5 | 0.5 | 5 | 1.2 | 50 | 15 | 6.75 |
|    | Bis-(3,4-dihydro-2H-pyran-2-methyl) sebacate: |  |  |  |  |  |  |  |
| 31 | 20 g. | 5 | 0.5 | 5 | 1.0 | 40 | 15 | 6.25 |
| 32 | 20 g. | 5 | 0.5 | 5 | 1.2 | 50 | 15 | 4.75 |
|    | Bis-(3,4-dihydro-2H-pyran-2-methyl) phthalate: |  |  |  |  |  |  |  |
| 33 | 20 g. | 5 | 0.5 | 5 | 0.5 | 120 | 120 | 3 |
| 34 | 20 g. | 3 | 0.5 | 5 | 0.8 | 30 | 35 | 7.25 |
| 35 | 20 g. | 3 | 0.5 | 5 | 1.0 | 20 | 15 | 6.75 |
| 36 | 20 g. | 3 | 0.5 | 5 | 1.2 | 50 | 15 | 7 |
| 37 | 20 g. | 3 | 0.5 | 5 | 1.2 | 20 | 10 | 5.75 |
| 38 | Bis-(3,4-dihydro-2H-pyran-2-methyl) fumarate: 10 g. | 3 | 0.5 | 5 | 0.6 | 20 | 10 | 6 |

[1] 0.7 ml. of 10% $BF_3$ in polypropylene glycol M.W. 2025, dissolved in 2 g. trichloromonofluoromethane.

EXAMPLE 39

Butanediol-1,4-bis-(3,4-dihydro-2H-pyran-2-yl) ether was prepared by heating under reflux for 72 hours the following composition:

| | G. |
|---|---|
| Butanediol-1,4-divinyl ether | 995 |
| Acrolein | 840 |
| Hydroquinone | 3 |

The product was fractionally distilled. A fraction of 1020 g. distilled over at 110°–115° C. at 0.3 mm. to 0.4 mm. pressure of mercury. Measured molecular weight of the product was 250 compared to a calculated value of 256.

A foaming composition containing the following ingredients was prepared.

| Trivinyl ether of propoxylated phenol-aldehyde condensate | g | 16 |
|---|---|---|
| 2:2-di-p-hydroxyphenol propane | g | 8 |
| Trichloromonofluoromethane | g | 12 |
| Siloxane oxyalkylene copolymer type silicone surfactant | g | 0.1 |
| Boron trifluoride, 10% in diethylene glycol | ml | 0.5 |

The first four ingredients were mixed together for 10 seconds and then boron trifluoride catalyst was added with additional stirring. The composition foamed after an induction period of 42 seconds to form a flexible weak foam. When cured at 90° C. for 10 minutes the foam was dimensionally unstable.

EXAMPLE 41

The tetravinyl ether of a polypropoxylated pentaerythritol was prepared as follows. The polypropoxylated pentaerythritol ("Pluracol" PeP 650) was treated with acetylene at 180°–190° C. and at a pressure of 200–250 p.s.i. in the presence of 5% by weight of potassium hydroxide. The reaction was considered complete when the infra-red spectrum of the product indicated the absence of hydroxyl groups. The catalyst residue was removed by filtration.

The following foaming composition was prepared.

Tetravinyl ether of polypropoxylated pentaerythritol _____ g__ 18.3
2:2-di-p-hydroxyphenyl propane _____ g__ 6.7
Trichloromonofluoromethane _____ g__ 8
Siloxane oxyalkylene copolymer type silicone surfactant _____ g__ 0.1
Boron trifluoride, 2% in diethylene glycol ____ml__ 0.25

The first four ingredients were mixed together for 10 seconds and then the boron trifluoride catalyst was added with additional stirring. The resulting foam was very soft and flexible with a slightly tacky skin.

EXAMPLES 42 to 55

A series of further foams were prepared, each of the following composition.

Vinyl ether _____ g__ 20
2:2-di-p-hydroxyphenyl propane _____ g__ 5
Trichloromonofluoromethane _____ g__ 5
Siloxane oxyalkylene copolymer type silicone surfactant _____ g__ 0.1
Catalyst _____ (1)

[1] As specified in Table V.

The above ingredients were mixed in a 250 ml. paper cup and the induction period and rise time of the resulting foams were measured. The description of the foams is given in Table V. The catalyst concentration is expressed as percentage by weight of the active ingredient.

EXAMPLES 56 to 59

A series of four foams were prepared, each of the following composition.

Vinyl ether _____ g__ 18.75
2:2-di-p-hydroxyphenol propane _____ g__ 6.25
Trichloromonofluoromethane _____ g__ 5
Siloxane oxyalkylene copolymer type silicone surfactant _____ g__ 0.1
Catalyst _____ (1)

[1] As specified in Table VI.

TABLE VI

| Example | Vinyl Ether | Catalyst | Amount of Catalyst, drops | Induction period, seconds | Height of Foam, inches |
|---|---|---|---|---|---|
| 56 | Butanediol-1,4-bis-(3,4-dihydro-2H-pyran-2-yl) ether. | Fluoboric acid, 5% in diethylene glycol. | 15 | 150 | 4¾ |
| 57 | ___do___ | Antimony fluoborate approx. 4% in diethylene glycol. | 10 | 170 | 4 |
| 58 | ___do___ | Fluoantimonic acid (HSbF$_6$), 13% in hexyl ether. | 20 | 90 | 4¾ |
| 59 | ___do___ | Fluoantimonic acid (HSbF$_6$), 33% in diethylene glycol. | 15 | 530 | 2 |

The above ingredients were mixed in a 250 ml. paper cup and the induction period and rise time of the resulting foams were measured. The description of the foams is given in Table VI. The catalyst concentration is expressed as percentage by weight of the active ingredient.

EXAMPLES 60 to 71

A series of twelve foams were prepared from crude 3,4 - dihydro - 2H - pyran-2-methyl-(3,4-dihydro-2H-pyran-2-carboxylate) employing different catalyst systems. The following mixture was employed in each case.

G.

Crude 3,4 - dihydro - 2H - pyran - 2 - methyl-(3,4-dihydro-2H-pyran-2-carboxylate) _____ 20
2:2-di-p-hydroxyphenyl propane _____ 5
Trichloromonofluoromethane _____ 5
Siloxane oxyalkylene copolymer type silicone surfactant _____ 0.1

The above ingredients were mixed together, and the specified catalyst added with stirring in a 250 ml. paper cup. The catalysts and description of the resulting foams are given in Table VII where catalyst concentration is expressed as percent by weight of active ingredient.

TABLE V

| Example | Vinyl Ether | Catalyst | Amount of Catalyst, drops | Induction period, seconds | Height of Foam, inches |
|---|---|---|---|---|---|
| 42 | Bis-(3,4-dihydro-2H-pyran-2-methyl) succinate. | Antimony pentafluoride, 12% in diethylene glycol. | 10 | 55 | 4½ |
| 43 | Bis-(3,4-dihydro-2H-pyran-2-methyl) adipate. | Antimony fluoborate, 40%–43% in water. | 3 | 20 | 6 |
| 44 | Bis-(3,4-dihydro-2H-pyran-2-methyl) azelate. | Fluoboric acid, 48%–50% in water. | 3 | 10 | 3½ |
| 45 | Bis-(3,4-dihydro-2H-pyran-2-methyl) sebacate. | Antimony pentachloride, 10% in diethylene glycol. | 20 | 45 | 3 |
| 46 | Butanediol-1,4-bis-(3,4-dihydro-2H-pyran-2-yl) ether. | Phosphorus pentafluoride, 10.5% in diethylene glycol. | 15 | 150 | 4½ |
| 47 | ___do___ | Stannous fluoborate, 46%–48% in water. | 2 | 10 | 2 |
| 48 | ___do___ | Hexafluorophosphoric acid, 65% in water. | 5 | Very fast. | |
| 49 | Divinyl ether of polypropylene glycol of M.W. 425. | Antimony pentafluoride, 12% in diethylene glycol. | 6 | Very fast. | |
| 50 | ___do___ | Fluoboric acid, 48%–50% in water. | 1 | Very fast. | |
| 51 | ___do___ | Ferric chloride, 10% in diethylene glycol. | 10 | 15 | 3½ |
| 52 | Tetravinyl ether of polypropoxylated pentaerythritol. | Fluoantimonic acid (HSbF$_6$), 65% in water. | 5 | 15 | 3 |
| 53 | ___do___ | Stannous fluoborate, 46%–48% in water. | 12 | 240 | 3 |
| 54 | ___do___ | Phosphorus pentafluoride, 10.5% in diethylene glycol. | 7 | Fast. | 3 |
| 55 | ___do___ | Ferric chloride, 10% in diethylene glycol. | 10 | 30 | 2½ |

EXAMPLES 72 to 90

Foams were produced in the following manner. Two mixtures were prepared. Mixture A contained distilled 3,4-dihydro-2H-pyran-2-methyl-(3,4-dihydro - 2H - pyran-2-carboxylate), 2:2-di-p-hydroxyphenyl propane, a low molecular weight resinous condensate of epichlorohydrin and 2:2-di-p-hydroxyphenyl propane, and a siloxane oxyalkylene copolymer type surfactant. Mixture B contained the trichloromonofluoromethane foaming agent and the boron trifluoride catalyst. Mixture B was added to Mixture A while stirring with a mechanical stirrer. After 10 seconds, the composition was poured into a mould. Table VIII describes the foaming compositions and the resulting foams.

EXAMPLES 91 to 112

Foams were prepared from ingredients made up in two portions. Mixture A contained crude 3,4-dihydro-2H-pyran-2-methyl-(3,4-dihydro-2H-pyran - 2 - carboxylate), a novolak resin, a low molecular weight resinous condensate of epichlorohydrin and 2:2-di-p-hydroxyphenyl propane, a siloxane oxyalkylene copolymer type silicone surfactant and trichloromonofluoromethane foaming agent. Mixture B contained the boron trifluoride catalyst. Mixture B was added to Mixture A while stirring with a mechanical stirrer and after 10 seconds the composition was poured into a mould. In Table IX the foaming compositions and the resulting foams are described.

TABLE VII

| Example | Catalyst | Amount used, drops | Induction period, seconds | Height of foam, inches |
|---|---|---|---|---|
| 60 | Ferric chloride (anhydrous) 10% in diethylene glycol. | 30 | 600 | 4¾ |
| 61 | Ferric chloride (anhydrous) 10% in ethanol. | 35 | >1,800 | 3 |
| 62 | Fluoboric acid 48%–50% in water. | 3 | 5 | 7¼ |
| 63 | Antimony pentafluoride, 12% in diethylene glycol. | 10 | 10 | |
| 64 | Antimony pentachloride, 10% in diethylene glycol. | 25 | 10 | 5½ |
| 65 | Fluoantimonic acid (HSbF₆), 65% in water. | 5 | 20 | 7¼ |
| 66 | Hexafluorophosphoric acid 65% in water. | 5 | 10 | 7¾ |
| 67 | Antimony fluoborate, 40%–43% in water. | 5 | 10 | 7½ |
| 68 | Stannous fluoborate, 46%–48% in water. | 15 | 225 | 6¼ |
| 69 | Lead fluoborate 50%–52% in water. | 20 | 390 | 4½ |
| 70 | Lead fluoborate (45%), fluoboroc acid (5%), in water. | 10 | 330 | 6 |
| 71 | Phosphorus pentafluoride, 10.5% in diethylene glycol. | 10 | 20 | 3 |

TABLE VIII

| Ex. | Distilled 3,4-dihydro-2H-pyran-2-methyl-(3,4-dihydro-2H-pyran-2-carboxylate), grams | 2:2-di-p-hydroxyphenyl-propane, grams | Low molecular weight resinous condensate of epichlorohydrin and 2:2-di-p-hydroxyphenylpropane, grams | Siloxane oxyalkylene copolymer type silicone surfactant, grams | Trichloromonofluoromethane, grams | Boron trifluoride 10% in diethylene glycol, grams | Induction period, sec. | Density, lbs./cu. ft. | Force required for 10% compression, lbs./sq. in. | |
|---|---|---|---|---|---|---|---|---|---|---|
| | | | | | | | | | Parallel to direction of rise | Perpendicular to direction of rise |
| 72 | 195 | 50 | 5 | 2 | 50 | 2.5 | 30 | 1.5 | 26.4 | 9.0 |
| 73 | 190 | 50 | 10 | 2 | 50 | 2.5 | 22 | 1.6 | 26.3 | 9.0 |
| 74 | 180 | 50 | 20 | 2 | 50 | 2.5 | 23 | 1.7 | 19.6 | 6.4 |
| 75 | 170 | 50 | 30 | 2 | 50 | 2.5 | 26 | 1.7 | 18.3 | 6.5 |
| 76 | 140 | 50 | 60 | 2 | 50 | 4 | 18 | 1.6 | 20.8 | 6.3 |
| 77 | 120 | 50 | 80 | 2 | 50 | 4 | 17 | 1.6 | 21.9 | 6.3 |
| 78 | 100 | 50 | 100 | 2 | 50 | 4 | 26 | 1.5 | 19.2 | 5.0 |
| 79 | 195 | 30 | 5 | 2 | 50 | 2.5 | 37 | 1.4 | 18.3 | 8.3 |
| 80 | 190 | 30 | 10 | 2 | 50 | 2.5 | 42 | 1.3 | 15.7 | 7.2 |
| 81 | 180 | 30 | 20 | 2 | 50 | 2.5 | 39 | 1.5 | 15.8 | 6.3 |
| 82 | 170 | 30 | 30 | 2 | 50 | 2.5 | 29 | 1.4 | 12.6 | 5.2 |
| 83 | 160 | 30 | 40 | 2 | 50 | 2.5 | 35 | 1.5 | 12.4 | 5.2 |
| 84 | 120 | 30 | 80 | 2 | 50 | 4 | 21 | 1.5 | 14.7 | 5.1 |
| 85 | 100 | 30 | 100 | 2 | 50 | 4 | 26 | 1.6 | 14.3 | 4.4 |
| 86 | 170 | 10 | 30 | 2 | 50 | 4 | 64 | 1.7 | 8.7 | 3.9 |
| 87 | 160 | 10 | 40 | 2 | 50 | 4 | 47 | 1.4 | 10.3 | 3.7 |
| 88 | 140 | 10 | 60 | 2 | 50 | 4 | 61 | 1.5 | 8.6 | 4.2 |
| 89 | 120 | 10 | 80 | 2 | 50 | 4 | 40 | 1.5 | 10.6 | 4.3 |
| 90 | 100 | 10 | 100 | 2 | 50 | 4 | 40 | 2.0 | 11.9 | 6.4 |

TABLE IX

| Ex. | Crude 3,4-dihydro-2H-pyran-2-methyl-(3,4-dihydro-2H-pyran-2-carboxylate), grams | Novolak resin, grams | Low molecular weight resinous condensate of epichlorohydrin and 2:2-di-p-hydroxyphenyl propane, grams | Siloxane oxyalkylene copolymer type silicone surfactant, grams | Trichloromonofluoromethane, grams | Boron trifluoride 10% in diethylene glycol, grams | Induction period, sec. | Density, lbs./cu. ft. | Force required for 10% compression, lbs./sq. in. | |
|---|---|---|---|---|---|---|---|---|---|---|
| | | | | | | | | | Parallel to direction of rise | Perpendicular to direction of rise |
| 91 | 190 | 20 | 10 | 0.5 | 50 | 5.0 | 85 | 1.7 | 11.6 | 5.0 |
| 92 | 180 | 20 | 20 | 0.5 | 50 | 5.0 | 90 | 1.8 | 13.6 | 5.5 |
| 93 | 170 | 20 | 30 | 0.5 | 50 | 5.0 | 80 | 2.2 | 13.4 | 5.6 |
| 94 | 160 | 20 | 40 | 0.5 | 50 | 5.0 | 40 | 1.6 | 12.4 | 6.0 |
| 95 | 150 | 20 | 50 | 0.5 | 50 | 5.0 | 65 | | 14.5 | 4.3 |
| 96 | 190 | 30 | 10 | 0.5 | 50 | 5.0 | 35 | 1.5 | 11.3 | 7.2 |
| 97 | 180 | 30 | 20 | 0.5 | 50 | 5.0 | 45 | 1.5 | 9.8 | 6.5 |
| 98 | 170 | 30 | 30 | 0.5 | 50 | 5.0 | 40 | 1.6 | 10.5 | 8.6 |
| 99 | 160 | 30 | 40 | 0.5 | 50 | 5.0 | 50 | 2.3 | 8.8 | 5.8 |
| 100 | 140 | 30 | 60 | 0.5 | 50 | 5.0 | 45 | 1.8 | 10.6 | 5.6 |
| 101 | 120 | 30 | 80 | 0.5 | 50 | 5.0 | 40 | 1.9 | 9.9 | 9.3 |
| 102 | 110 | 30 | 90 | 0.5 | 50 | 5.0 | 45 | 2.1 | 16.5 | 10.8 |
| 103 | 100 | 30 | 100 | 0.5 | 50 | 5.0 | 55 | 2.5 | 9.1 | 4.8 |
| 104 | 90 | 30 | 110 | 0.5 | 50 | 5.0 | 50 | 2.7 | 11.8 | 7.1 |
| 105 | 190 | 40 | 10 | 0.5 | 50 | 5.0 | 50 | 1.6 | 8.6 | 6.0 |
| 106 | 180 | 40 | 20 | 0.5 | 50 | 5.0 | 40 | 1.6 | 9.1 | 5.1 |
| 107 | 190 | 50 | 10 | 0.5 | 50 | 5.0 | 35 | 1.8 | 8.4 | 5.5 |
| 108 | 180 | 50 | 20 | 0.5 | 50 | 5.0 | 40 | 1.7 | 8.4 | 4.1 |
| 109 | 190 | 60 | 10 | 0.5 | 50 | 5.0 | 35 | 1.8 | 9.9 | 7.6 |
| 110 | 180 | 60 | 20 | 0.5 | 50 | 5.0 | 30 | 1.7 | 8.8 | 5.4 |
| 111 | 190 | 70 | 10 | 0.5 | 50 | 5.0 | 30 | 1.8 | 11.6 | 6.6 |
| 112 | 180 | 70 | 20 | 0.5 | 50 | 5.0 | 30 | 1.8 | 11.3 | 8.2 |

EXAMPLE 113

A foaming composition containing the following ingredients was prepared.

| | |
|---|---|
| Butanediol-1,4-bis-(3,4-dihydro-2H - pyran - 2 - yl) ether _____g__ | 10 |
| 2:2-di-p-hydroxyphenyl propane _____g__ | 3 |
| Low molecular weight resinous condensate of epichlorohydrin and 2:2-di - p - hydroxyphenyl propane _____g__ | 12 |
| Trichloromonofluoromethane _____g__ | 5 |
| Siloxane oxyalkylene coplymer type silicone surfactant _____g__ | 0.1 |
| Boron trifluoride, 10% in diethylene glycol __ml__ | 0.15 |

The first five ingredients were mixed for 10 seconds and the boron trifluoride catalyst was then added with additional stirring. After an induction period of 39 seconds an excellent white foam with fine cell structure and a good skin was obtained.

EXAMPLES 114 TO 119

A series of six foams were prepared containing 2:2-di-p-hydroxyphenyl propane, a high viscosity epoxidized polyolefin ("Oxiron" 2000) and different vinyl ethers using the following procedure. The vinyl ether, 2:2-di-p-hydroxyphenyl propane, epoxidized polyolefin, the siloxane oxyalkylene copolymer type silicone surfactant and the trichloromonofluoromethane foaming agent were mixed together. The boron trifluoride catalyst was then added and and the mixture was poured into a 250 ml. paper cup and stirred for 10 to 15 seconds. The induction period, the period of rise of the foam and the height of the foam after rise were measured. The compositions and characteristics of the resulting foams are shown in Table X.

EXAMPLE 121

The following foaming composition was prepared.

| | |
|---|---|
| Trivinyl ether of propoxylated phenol-aldehyde condensate _____g__ | 10 |
| 2:2-di-p-hydroxyphenyl propane _____g__ | 2.5 |
| Low molecular weight resinous condensate of epichlorohydrin and 2:2-di - p - hydroxyphenyl propane _____g__ | 12.5 |
| Trichloromonofluoromethane _____g__ | 10 |
| Siloxane Oxyalkylene copolymer type silicone surfactant _____g__ | 0.1 |
| Boron trifluoride, 20% in diethylene glycol __ml__ | 0.2 |

The first five ingredients were mixed together for 10 seconds and then the boron trifluoride catalyst was added with additional stirring. The composition foamed to form a flexible weak foam.

EXAMPLE 122

The following foaming composition was prepared.

| | |
|---|---|
| Tetravinyl ether of polypropoxylated pentaerythritol _____g__ | 10 |
| p-Hydroxybenzoic acid _____g__ | 2 |
| Low molecular weight resinous condensate of epichlorohydrin and 2:2 - di-p - hydroxyphenyl propane _____g__ | 12 |
| Trichloromonofluoromethane _____g__ | 10 |
| Siloxane oxyalkylene copolymer type silicone surfactant _____g__ | 0.1 |
| Boron trifluoride, 5% in diethylene glycol ___ml__ | 0.2 |

The first five ingredients were mixed together for 10 seconds and then the boron trifluoride catalyst was added with additional stirring. The composition foamed after

TABLE X

| Ex. | Vinyl Ether | 2:2-di-p-hydroxyphenyl propane, g. | High viscosity epoxidized polyolefin, g. | Siloxane oxyalkylene copolymer type surfactant, g. | Trichloro monofluoro methane, g. | Boron trifluoride 10% in Diethylene glycol, ml. | Induction Period, sec. | Rise Period, sec. | Height, in. |
|---|---|---|---|---|---|---|---|---|---|
| 114 | 3,4-dihydro-2H-pyran-2-methyl-(3,4-dihydro-2H-pyran-2-carboxylate), 20 g | 5 | 5 | 0.5 | 5 | 0.5 | 4 | 20 | 9 |
| 115 | Bis-(3,4-dihydro-2H-pyran-2-methyl) adipate, 20 g | 5 | 5 | 0.5 | 5 | 0.5 | 4 | 40 | 7.75 |
| 116 | Bis-(3,4-dihydro-2H-pyran-2-methyl) succinate, 20 g | 5 | 5 | 0.5 | 5 | 0.5 | 7 | 60 | 6.75 |
| 117 | Bis-(3,4-dihydro-2H-pyran-2-methyl) azelate, 20 g | 5 | 5 | 0.5 | 5 | 0.5 | 6 | 30 | 5.5 |
| 118 | Bis-(3,4-dihydro-2H-pyran-2-methyl) sebacate, 20 g | 5 | 5 | 0.5 | 5 | 0.5 | 8 | 50 | 3.75 |
| 119 | Bis-(3,4-dihydro-2H-pyran-2-methyl) phthalate, 20 g | 5 | 5 | 0.5 | 5 | 0.5 | 7 | 35 | 5.75 |

EXAMPLE 120

The following foaming composition was prepared.

| | |
|---|---|
| Divinyl ether of polypropylene glycol of molecular weight 425 _____g__ | 10 |
| 2:2-di-p-hydroxphenyl propane _____g__ | 2 |
| Low molecular weight resinuous condensation product of epichlorohydrin and 2:2-di-p-hydroxyphenyl propane _____g__ | 12 |
| Trichloromonofluoromethane _____g__ | 5 |
| Siloxane oxyalkylene copolymer type silicone surfactant _____g__ | 0.1 |
| Boron trifluoride, 5% in diethylene glycol ___ml__ | 0.15 |

The first five ingredients were mixed together for 10 seconds and then the boron trifluoride catalyst was added with additional stirring. After an induction period of 12 seconds the composition foamed to form a flexible weak foam.

an induction period of 10 seconds to give a flexible weak foam.

EXAMPLE 123

The following foaming composition was prepared.

| | |
|---|---|
| Tetravinyl ether of polypropoxylated pentaerythritol _____g__ | 11.2 |
| 2:2-di-p-hydroxyphenyl propane _____g__ | 3.8 |
| Low molecular weight resinuous condensate of epichlorohydrin and 2:2-di-p-hydroxyphenyl propane _____g__ | 10 |
| Trichloromonofluoromethane _____g__ | 5 |
| Siloxane oxyalkylene copolymer type silicone surfactant _____g__ | 0.1 |
| Boron trifluoride, 2% in diethylene glycol ___ml__ | 0.25 |

The first five ingredients were mixed together for 10 seconds and then the boron trifluoride catalyst was added with additional stirring. The composition foamed after an induction period of 30 seconds to produce a flexible soft weak foam.

EXAMPLE 124

The following two mixtures were prepared:

MIXTURE A

| | G. |
|---|---|
| Crude 3,4-dihydro - 2H - pyran - 2 - methyl - (3,4-dihydro-2H-pyran-2-carboxylate) | 150 |
| Epoxy novolak resin (Dow "DEN" 438) | 50 |
| Siloxane oxyalkylene copolymer type silicone surfactant | 2.5 |
| Trichloromonofluoromethane | 50 |
| Trimethoxyboroxine | 10 |

MIXTURE B

Boron trifluoride (10% in diethylene glycol) _____ 7.5

Mixture B was added to Mixture A with rapid stirring. After 20 seconds, the mixed composition was poured into a mould and, after 80 seconds, foaming occurred to give an almost white foam of good structure. The foam had a core density of 1.4 lbs./ft.³ and needed a force of 4.9 lbs./sq. inch for 10% compression perpendicular to the direction of rise and 7.4 lbs./sq. inch force for 10% compression parallel to the direction of rise.

EXAMPLE 125

The following two mixtures were prepared:

MIXTURE A

| | G. |
|---|---|
| Crude 2,3 - dihydro - 2H - pyran - 2 - methyl-(3,4-dihydro-2H-pyran-2-carboxylate) | 100 |
| Low molecular weight resinous condensate of epichlorohydrin and 2:2-di-p-hydroxyphenyl propane | 100 |
| Siloxane oxyalkylene copolymer type silicone surfactant | 2.5 |
| Trichloromonofluoromethane | 50 |
| Trimethoxyboroxine | 10 |

MIXTURE B

Boron trifluoride (10% in diethylene glycol) _____ 7.5

Mixture A was blended with Mixture B with rapid stirring. After 20 seconds, the mixed composition was poured into a mould, and foaming commenced after 73 seconds. A white foam with a tough skin resulted. The foam had a core density of 1.5 lbs./cu. ft. The force needed for 10% compression was 7.6 lbs./sq. in. parallel to the direction of rise and 5.5 lbs./sq. in. in perpendicular to it.

EXAMPLE 126

The following two mixtures were prepared:

MIXTURE A

| | G. |
|---|---|
| Crude 3,4-dihydro - 2H - pyran - 2 - methyl - (3,4-dihydro-2H-pyran-2-carboxylate) | 50 |
| Vinyl cyclohexene dioxide | 150 |
| Siloxane oxyalkylene copolymer type silicone surfactant | 2.5 |
| Trichloromonofluoromethane | 60 |

MIXTURE B

Trimethoxyboroxine _____ 6

Mixture A was blended with Mixture B with rapid stirring. After 10 seconds, the mixed composition was poured into a mould and foaming began after 91 seconds. The foam rose to yield a rather coarse white foam of 1.0 lb./cu. ft. density which did not shrink on cooling.

EXAMPLE 127

The following two mixtures were prepared:

MIXTURE A

| | G. |
|---|---|
| Poly(allylglycidyl ether) | 150 |
| Crude 3,4-dihydro - 2H - pyran - 2 - methyl - (3,4-dihydro-2H-pyran-2-carboxylate) | 50 |
| Siloxane oxyalkylene copolymer type silicone surfactant | 2.5 |
| Trichloromonofluoromethane | 50 |

MIXTURE B

Boron trifluoride (10% in diethylene glycol) ____ 5

Mixture A was blended with Mixture B using high speed stirring. After 10 seconds the mixed composition was poured into a mould and foaming began after 30 seconds. A coarse foam of 1.4 lbs./cu. ft. core density resulted.

EXAMPLE 128

The following foaming composition was prepared.

| | | |
|---|---|---|
| Butanediol-1,4-divinyl ether | g | 10 |
| Low molecular weight resinous condensation product of epichlorohydrin and 2:2-di-p-hydroxyphenyl propane | g | 15 |
| Trichloromonofluoromethane | g | 5 |
| Siloxane oxyalkylene copolymer type silicone surfactant | g | 0.1 |
| Boron trifluoride, 5% in diethylene glycol | ml | 0.15 |

The first four ingredients were mixed together for 10 seconds and then the boron trifluoride catalyst was added with additional stirring. After an induction period of 6 seconds the composition foamed to form a white flexible weak foam.

EXAMPLE 129

A foaming composition containing the following ingredients was prepared.

| | | |
|---|---|---|
| Butanediol-1,4-bis - (3,4 - dihydro - 2H - pyran - 2-yl)ether | g | 12 |
| Low molecular weight resinous condensate of epichlorohydrin and 2:2-di-p-hydroxy-phenyl propane | g | 12 |
| Trichloromonofluoromethane | g | 5 |
| Siloxane oxyalkylene copolymer type silicone surfactant | g | 0.1 |
| Boron trifluoride, 20% in diethylene glycol | ml | 0.2 |

The first four ingredients were mixed for 10 seconds and the boron trifluoride catalyst was then added with additional stirring. After an induction period of 48 seconds a rigid foam was obtained.

EXAMPLES 130 TO 137

A series of eight foams were prepared containing a high viscosity epoxidized polyolefin ("Oxiron" 2000) and different vinyl ethers using the following procedure. The vinyl ether, the epoxidized olefin, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table XI.

TABLE XI

| Example | Vinyl Ether | High Viscosity Epoxidized polyolefin, g. | Siloxane oxyalkylene copolymer type silicone surfactant, g. | Trichloro-monofluoro-methane, g. | Boron trifluoride 10% in diethylene glycol, ml. | Induction period, sec. | Rise period, sec. | Height, in. |
|---|---|---|---|---|---|---|---|---|
| 130 | 3,4-dihydro-2H-pyran-2-methyl-(3,4-dihydro-2H-pyran-2-carboxylate): 20 g | 10 | 0.5 | 5 | 0.25 | 10 | 2 | 2.25 |
| 131 | 20 g | 5 | 0.5 | 5 | 0.25 | 10 | 40 | 2.5 |
| 132 | 20 g | 5 | 0.5 | 5 | 0.5 | 5 | 30 | 5.75 |
| 133 | Bis-(3,4-dihydro-2H-pyran-2-methyl) adipate: 20 g. | 5 | 0.5 | 5 | 0.5 | 7 | 20 | 5.5 |
| 134 | Bis-(3,4-dihydro-2H-pyran-2-methyl) succinate: 20 g. | 5 | 0.5 | 5 | 0.5 | 5 | 50 | 6.75 |
| 135 | Bis-(3,4-dihydro-2H-pyran-2-methyl) azelate: 20 g. | 5 | 0.5 | 5 | 0.5 | 8 | 20 | 4.75 |
| 136 | Bis-(3,4-dihydro-2H-pyran-2-methyl) sebacate: 20 g. | 5 | 0.5 | 5 | 0.5 | 10 | 15 | 5 |
| 137 | Bis-(3,4-dihydro-2H-pyran-2-methyl) phthalate: 20 g. | 5 | 0.5 | 5 | 0.5 | 5 | 15 | 3.75 |

EXAMPLE 138

The divinyl ether of polypropylene glycol of molecular weight 425 was prepared as follows. Polypropylene glycol of molecular weight 425 was treated with acetylene at 180°–190° C. and at a pressure of 200–250 p.s.i. in the presence of 5% by weight of potassium hydroxide. The reaction was considered complete when the infra-red spectrum of the product indicated the absence of hydroxyl groups. The catalyst residue was removed by filtration.

The following foaming composition was prepared:

Divinyl ether of polypropylene glycol of molecular weight 425 _____ g__ 10
Low molecular weight resinous condensate of epichlorohydrin and 2:2-di-p-hydroxyphenyl propane _____ g__ 15
Trichloromonofluoromethane _____ g__ 5
Siloxane oxyalkylene copolymer type silicone surfactant _____ g__ 0.1
Boron trifluoride, 10% in diethylene glycol ___ml__ 0.15

The first four ingredients were mixed together for 10 seconds and then the boron trifluoride catalyst was added with additional stirring. After an induction period of 12 seconds the composition foamed to form a flexible weak foam.

EXAMPLE 139

The following foaming composition was prepared:

Trivinyl ether of propoxylated phenolaldehyde condensate _____ g__ 10
Low molecular weight resinous condensate of epichlorohydrin and 2:2-di-p-hydroxyphenyl propane _____ g__ 15
Trichloromonofluoromethane _____ g__ 10
Siloxane oxyalkylene copolymer type silicone surfactant _____ g__ 0.1
Boron trifluoride, 10% in diethylene glycol ___ml__ 0.38

The first four ingredients were mixed together for 10 seconds and then the boron trifluoride catalyst was added with additional stirring. The composition foamed to form a flexible weak foam.

EXAMPLE 140

The following two sets of ingredients:

| | 1 | 2 |
|---|---|---|
| Tris-(3,4-dihydro-2H-pyran-2-methyl) phosphate. | 5 g | 10 g. |
| Bis-(3,4-dihydro-2H-pyran-2-methyl) adipate. | 10 g | 10 g. |
| High viscosity epoxidized polyolefin ("Oxiron" 2000). | 5 g | 5 g. |
| Siloxane oxyalkylene copolymer type silicone surfactant. | 0.5 g | 0.5 g. |
| Trichloromonofluoromethane | 5 g | 5 g. | were mixed separately and then to each one was added with additional stirring 1.5 ml. of a solution containing 10% by weight of boron trifluoride in diethylene glycol. The mixtures were then poured into 250 ml. paper cups. The characteristics of the resulting foams are as follows:

| | 1 | 2 |
|---|---|---|
| Induction period | 5 sec | 35 sec. |
| Rise time | 20 sec | 180 sec. |
| Height of foam | 7.5 in | 7.5 in. |

EXAMPLE 141

The following ingredients:

G.
Polyvinylchloride _____ 1
3,4-dihydro-2H-pyran-2-methyl-(3,4-dihydro-2H-pyran-2-carboxylate) _____ 19
Dioctyl phthalate _____ 6
2:2-di-p-hydroxyphenyl propane _____ 2
Siloxane oxyalkylene copolymer type silicone surfactant _____ 2 when mixed using heating when necessary. The composition was then cooled to room temperature and 12 g. of trichloromonofluoromethane were added with stirring, then 1 g. of a solution containing 10% by weight of boron trifluoride etherate in glycol was added. A light, slow rising, resilient foam of uniform cell structure was obtained.

EXAMPLE 142

The following ingredients:

G.
3,4-dihydro-2H-pyran-2-methyl-(3,4-dihydro-2H-pyran-2-carboxylate) _____ 17
Polyvinyl chloride-polyvinyl acetate copolymer ____ 3
Dioctyl phthalate _____ 6
Siloxane oxyalkylene copolymer type silicone surfactant _____ 2
2:2-di-p-hydroxyphenyl propane _____ 2 were mixed using heating where necessary. The composition was cooled to room temperature and 10 g. of trichloromonofluoromethane added with stirring. Then 1 g. of solution containing 10% by weight of boron trifluoride etherate in glycol was added. After 20 seconds the composition foamed to produce a light coloured resilient foam of non-uniform structure.

EXAMPLE 143

The following ingredients:

G.
3,4-dihydro-2H-pyran-2-methyl-(3,4-dihydro-2H-pyran-2-carboxylate) _____ 18
2:2-di-p-hydroxyphenyl propane _____ 2
Siloxane oxyalkylene copolymer type silicone surfactant _____ 0.5
Trichloromonofluoromethane _____ 4
Ammonium chloride _____ 10 were mixed and then 2 g. of a solution containing 10% by weight of boron trifluoride etherate in glycol were added. The composition foamed after 15 seconds to give a light weight dark foam of uniform cell size which was "self-extinguishing" by ASTM-D-1692-59T.

EXAMPLES 144 TO 149

A series of six foaming compositions were prepared, the proportions of ingredients varying only in the amount of the amine and the boron trifluoride catalyst ingredients. A first mixture was prepared by dissolving 2:2-di-p-hydroxyphenyl propane in crude 3,4-dihydro-2H-pyran-2-methyl-(3,4-dihydro-2H-pyran-2-carboxylate) at 100° C., cooling to room temperature and then adding the siloxane oxyalkylene copolymer type silicone surfactant and the distilled dimethyl tertiary amine derived from coconut fatty acids ("Armeen" DMCD). The second mixture consisted of trichloromonofluoromethane and a solution containing 10% by weight of boron trifluoride in polypropylene glycol of 2025 molecular weight. The second mixture was added to the first mixture while stirring with a high speed mixer. After 10 seconds of stirring, the mixture was poured into a mould. The resulting foams were rigid and had a density of approximately 2 pounds per cubic foot. The compositions and induction period and rise time are shown in Table XII. It can be seen that by increasing the proportion of the amine ingredient, both the induction period and rise time can be increased thus providing control of the foaming process.

What we claim is:

1. A foamed cellular polymeric material which is reaction product of a foamable composition comprising
   (A) at least one polymerizable cyclic vinyl ether of the generic formula

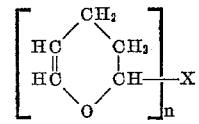

wherein $n$ is an integer having a value of at least two and X is a linking group having a valence equal to $n$;
   (B) a material reactive with the ethylenic double bonds of said vinyl ether and selected from the group consisting of
      (BB) compatible phenolic compounds;
      (BC) compatible epoxidized materials containing at least one epoxide group per molecule; and
      (BD) mixtures of (BB) and (BC);
   (C) an acidic catalyst capable of promoting the polymerizing reaction between (A) and (B) and selected from the group consisting of strong proton-donating acids and Lewis acids; and
   (D) a foaming agent vaporizing at the temperature of reaction of (A) with (B).

2. A foamed cellular polymeric material as claimed in

TABLE XII

| Example | Crude 3,4-dihydro-2H-pyran-2-methyl-(3,4-dihydro-2H-pyran-2-carboxylate), grams | 2:2-di-p-hydroxyphenyl propane, grams | Siloxane oxyalkylene copolymer type silicone surfactant, grams | Dimethyl tertiary amine derived from coconut fatty acids, grams | Trichloromonofluoromethane, grmas | Boron trifluoride 10% in polypropylene glycol M.W. 2025, grams | Induction Period, seconds | Rise Period, seconds |
|---|---|---|---|---|---|---|---|---|
| 144 | 200 | 50 | 2.0 | ---- | 50 | 5.0 | 15 | 10 |
| 145 | 200 | 50 | 2.0 | 0.25 | 50 | 5.5 | 15 | 11 |
| 146 | 200 | 50 | 2.0 | 0.75 | 50 | 6.5 | 27 | 20 |
| 147 | 200 | 50 | 2.0 | 1.25 | 50 | 8.5 | 30 | 20 |
| 148 | 200 | 50 | 2.0 | 1.75 | 50 | 10.0 | 35 | 20 |
| 149 | 200 | 50 | 2.0 | 2.25 | 50 | 12.0 | 40 | 23 |

EXAMPLE 150

The following ingredients:

| | G. |
|---|---|
| Crude 3,4-dihydro-2H-pyran-2-methyl-(3,4-dihydro-2H-pyran-2-carboxylate) | 232 |
| 2:2-di-p-hydroxyphenyl propane | 58 |
| Low molecular weight resinous condensate of epichlorohydrin and 2:2 - di - p - hydroxyphenyl propane | 100 |
| Siloxane oxyalkylene copolymer type silicone surfactant | 2 | were mixed for 2 minutes using a high speed stirrer and then 65 g. of trichloromonofluoromethane were added. Stirring was continued for an additional 30 seconds and 6 ml. of a solution containing 20% by weight of boron trifluoride in diethylene glycol were added. The composition foamed immediately to give a white foam. When the procedure was repeated using the same ingredients but adding to the catalyst solution 10 ml. of a solution of a boron trifluoride-amine complex the induction time was increased to 20 to 30 seconds permitting better control of the foaming process. The following boron trifluoride-amine complexes were found to be effective.

(1) Boron trifluoride-triethanolamine complex, 20% by weight in methylalcohol solution.
(2) Boron trifluoride-pyridine complex, 7% by weight in glycol monoethylether solution.
(3) Boron trifluoride-triisopropanolamine borate complex, 20% by weight in butyl alcohol solution.
(4) Boron trifluoride-trioctadecylamine complex, 5% by weight in xylene solution.

claim 1 wherein the proportions of the ingredients of the foamable composition are such that:
   (BB) the number of hydroxyl groups provided by the phenolic compound is less than the number of —HC=CH— groups provided by the vinyl ether; and
   (BD) the number of hydroxyl groups provided by the phenolic compound is not greater than about 75% of the combined number of —HC=CH— and epoxide groups provided by the vinyl ether and epoxidized material, respectively.

3. A foamed cellular polymeric material as claimed in claim 1 wherein the material reactive with the ethylenic double bonds of the vinyl ether ingredient of the foamable composition is a compatible phenolic compound.

4. A foamed cellular polymeric material as claimed in claim 3 wherein the proportions of the ingredients of the foamable composition are such that the number of hydroxyl groups provided by the phenolic compound is less than the number of —HC=CH— groups provided by the vinyl ether.

5. A foamed cellular polymeric material as claimed in claim 1 wherein the foamable composition comprises 3,4-dihydro - 2H - pyran-2-methyl-(3,4-dihydro-2H-pyran-2-carboxylate) as a vinyl ether ingredient.

6. A foamed cellular polymeric material as claimed in claim 2 wherein the foamable composition comprises 3,4-dihydro - 2H - pyran-2-methyl-(3,4-dihydro-2H-pyran-2-carboxylate) as a vinyl ether ingredient.

7. A foamed cellular polymeric material as claimed in claim 3 wherein the foamable composition comprises 3,4- dihydro - 2H - pyran-2-methyl-(3,4-dihydro-2H-pyran-2-carboxylate) as a vinyl ether ingredient.

8. A foamed cellular polymeric material as claimed in claim 4 wherein the foamable composition comprises 3,4-dihydro - 2H - pyran-2-methyl-(3,4-dihydro-2H-pyran-2-carboxylate) as a vinyl ether ingredient.

9. A foamed cellular polymeric material as claimed in claim 1 wherein the foamable composition comprises bis-(3,4-dihydro-2H-pyran-2-methyl)phthalate as a vinyl ether ingredient.

10. A foamed cellular polymeric material as claimed in claim 7 wherein the foamable composition comprises 2:2-di-p-hydroxyphenyl propane as a phenolic ingredient.

11. A foamed cellular polymeric material as claimed in claim 8 wherein the foamable composition comprises 2:2-di-p-hydroxyphenyl propane as a phenolic ingredient.

12. A foamed cellular polymeric material as claimed in claim 1 wherein the acidic catalyst of the foamable composition is at least one member selected from the group consisting of boron trifluoride and boron trifluoride etherate.

13. A foamed cellular polymeric material as claimed in claim 1 wherein the foaming agent of the foamable composition is a chlorofluorocarbon.

14. A process which comprises mixing
(A) at least one polymerizable cyclic vinyl ether of the generic formula

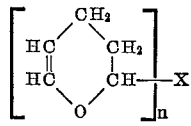

wherein $n$ is an integer having a value of at least two and X is a linking group having a valence equal to $n$;
(B) a material reactive with the ethylenic double bonds of said vinyl ether and selected from the group consisting of
   (BB) compatible phenolic compounds;
   (BC) compatible epoxidized materials containing at least one epoxide group per molecule; and
   (BD) mixture of (BB) and (BC);
(C) an acidic catalyst capable of promoting the polymerizing reaction between (A) and (B) and selected from the group consisting of strong proton-donating acids and Lewis acids; and
(D) a foaming agent vaporizing at the temperature of reaction of (A) with (B), and allowing the mixture naturally to self-expand into a foamed cellular polymeric material.

15. A process as claimed in claim 14 wherein the proportions of the ingredients of the expandable mixture are such that
   (BB) the number of hydroxyl groups provided by the phenolic compound is less than the number of —HC=CH— groups provided by the vinyl ether; and
   (BD) the number of hydroxyl groups provided by the phenolic compound is not greater than about 75% of the combined number of —HC=CH— and epoxide groups provided by the vinyl ether and epoxidized material, respectively.

References Cited by the Examiner

UNITED STATES PATENTS

| | | | |
|---|---|---|---|
| 2,998,415 | 8/1961 | Geiser | 260—91.1 |
| 3,051,665 | 8/1962 | Wismer | 260—2.5 |
| 3,128,258 | 4/1964 | Doedens et al. | 260—2.5 |
| 3,232,892 | 2/1966 | Fisher | 260—2.5 |

MURRAY TILLMAN, *Primary Examiner.*

M. FOELAK, *Assistant Examiner.*